(12) United States Patent
Micheli et al.

(10) Patent No.: US 12,319,173 B2
(45) Date of Patent: Jun. 3, 2025

(54) INSULATING SUPPORT ASSEMBLY FOR A CATENARY ADAPTED FOR POWERING AN ELECTRICAL VEHICLE, NOTABLY A TRAM OR A TROLLEYBUS, AND RELATED CATENARY

(71) Applicant: ALSTOM Holdings, Saint-Ouen-sur-Seine (FR)

(72) Inventors: Silvano Micheli, Abbadia Lariana (IT); Dario Giugliano, Lecco (IT); Giampietro Mangili, Pontida (IT)

(73) Assignee: ALSTOM Holdings, Saint-Ouen-sur-Seine (FR)

( * ) Notice: Subject to any disclaimer, the term of this patent is extended or adjusted under 35 U.S.C. 154(b) by 951 days.

(21) Appl. No.: 17/303,652

(22) Filed: Jun. 3, 2021

(65) Prior Publication Data
US 2021/0387549 A1    Dec. 16, 2021

(30) Foreign Application Priority Data

Jun. 10, 2020 (EP) .................................. 20305632

(51) Int. Cl.
*B60M 1/18* (2006.01)
*B60M 1/20* (2006.01)
*B60M 1/16* (2006.01)

(52) U.S. Cl.
CPC .............. *B60M 1/18* (2013.01); *B60M 1/20* (2013.01); *B60M 1/16* (2013.01)

(58) Field of Classification Search
CPC . B60M 1/16; B60M 1/18; B60M 1/20; B60M 1/00; B60M 1/02; B60M 1/12; B60M 1/23; B60M 1/26; B60M 1/24; B60M 1/22

USPC ................................... 191/39, 40, 41, 42, 43
See application file for complete search history.

(56) References Cited

U.S. PATENT DOCUMENTS

| 716,978 | A |   | 12/1902 | Andersen |
|---|---|---|---|---|
| 966,102 | A | * | 8/1910 | Kempton .................. B60M 1/23 191/39 |
| 1,962,259 | A | * | 6/1934 | Ritchie .................... B60M 1/18 191/39 |
| 2,491,973 | A | * | 12/1949 | Hanna ...................... B60M 1/20 191/40 |
| 5,542,511 | A | * | 8/1996 | Steiner ................... B60M 1/225 191/41 |

FOREIGN PATENT DOCUMENTS

EP        0475342 A1    3/1992

OTHER PUBLICATIONS

European Search Report for European Application No. EP 20305632.0 dated Nov. 17, 2020 in 9 pages.

* cited by examiner

*Primary Examiner* — Zachary L Kuhfuss
*Assistant Examiner* — Heaven R Buffington
(74) *Attorney, Agent, or Firm* — Knobbe, Martens, Olson & Bear, LLP

(57) ABSTRACT

An insulating support assembly for a catenary is adapted for powering an electrical vehicle. The assembly includes a base part adapted to connect the insulating support assembly to a section insulator of the catenary, a suspension insulator extending from the base part along a reference axis, and a suspension plate suitable to be hung to a supporting pole of the catenary. The suspension plate is connected to an upper part of and is movable relative to the suspension insulator.

14 Claims, 3 Drawing Sheets

INSULATING SUPPORT ASSEMBLY FOR A CATENARY ADAPTED FOR POWERING AN ELECTRICAL VEHICLE, NOTABLY A TRAM OR A TROLLEYBUS, AND RELATED CATENARY

CROSS-REFERENCE TO RELATED APPLICATION

This application claims priority to European Patent Application No. 20305632.0 filed on Jun. 10, 2020, the disclosure of which including the specification, the drawings, and the claims is hereby incorporated by reference in its entirety.

FIELD OF THE INVENTION

The present invention relates in general to an insulating support assembly for applications in the field of transportation.

More in particular, the present invention concerns an insulating support assembly for a catenary adapted for powering an electrical vehicle, notably a tram or a trolleybus, and a catenary comprising such assembly.

BACKGROUND OF THE INVENTION

As known, in the field of public transportation there are used power overhead lines for feeding various types of transport vehicles travelling along the service routes, such as tramways, trolleybuses, surface or light metros, and the like.

Basically, these overhead power lines, usually referred to as catenaries, comprise contact wires which carry the electric power transferred to the vehicles via an operative coupling with current collector equipment provided onboard of the vehicles themselves, such as pantographs, bow collectors, trolley poles, or similar devices.

The contact wires are suspended at a certain height above the road level or above the railway tracks by connecting them to supporting poles which are installed along the various service routes of the transportation network.

Further, along a catenary there are provided section insulators, namely devices which are connected to the contact wire and are devised to electrically separate two electrical sections of the catenary, while allowing the smooth passage of pantographs with a continuous collection of current, such as in a crossover between two adjacent tracks, at curves or turnouts, et cetera.

The section insulators are in turn mechanically connected to the supporting poles via the interposition of insulating support assemblies.

At present, although known solutions actually implemented allow a proper connection of the section insulators to the supporting poles, they still present some drawbacks.

For example, once in operations, the contact wires of catenaries are subject to thermal stresses which can lead to variations of their length due to contractions/dilatations; as a consequence, in known solutions, it has been noted that some parts of the whole assembly formed by connecting the various parts, namely the contact wire, the section insulator, the insulating supports and the cantilever beam of a supporting pole, have been subject to mechanical stresses leading to distortions if not to complete breakages, in particular of parts of the insulating support assemblies.

In order to face such issue, some solutions foresee to equip the insulating support assemblies with an additional pulley system mounted on a dedicated frame.

However, such known solutions have only partially mitigated the issue of compensating the thermal variations of the contact wire since they have evidenced reliability problems, and in any case they are rather cumbersome and entail other downsides especially in terms of realization and assembly costs.

To this point, another aspect still not satisfying at present resides in the fact that, when assembling, there are unavoidable and unexpected mechanical tolerances, which render the assembly with section insulators rather difficult if not impossible.

Further, the known supporting insulator assemblies are not easily adaptable to different types of section insulators used along the catenaries, and/or to different types of installing configurations.

SUMMARY OF THE INVENTION

Therefore, it is a main aim of the present invention to provide a solution suitable to mitigate at least some of above indicated issues, and in particular to provide an insulating support assembly offering substantial improvements over known solutions, in particular as regard to the capability of coping with mechanical stresses exerted on the assembly, due for example to thermal variations of the contact wire of catenaries, or to others causes.

Within the scope of this aim, an object of the present invention is to provide an insulating support assembly which can be easily installed and allows reducing, with respect to known solutions, the difficulties of assembling with other components of the catenaries, and in particular with section insulators.

Yet a further object of the present invention is to provide an insulating support assembly which can be used with different types of section insulators and/or different types of installing configurations, which is highly reliable, easy to realize and at competitive costs.

This aim, these objects and others which may become apparent from the following description are achieved by an insulating support assembly for a catenary adapted for powering an electrical vehicle, wherein it comprises at least:
 a base part which is adapted to connect the insulating support assembly to a section insulator of the catenary;
 a suspension insulator which extends from the base part along a reference axis; and
 a suspension device which is suitable to be hung to a supporting pole of the catenary, wherein the suspension device is connected to an upper part of and is movable relative to the suspension insulator.

According to some embodiments, the insulating support assembly according to the invention may comprise one or more of the following features, which may be combined in any technical feasible combination:
 the suspension device is connected to an upper part of and is rotatable around said reference axis relative to the suspension insulator;
 the base part is configured to connect the insulating support assembly to the section insulator with the section insulator movable relative to at least part of the insulating support assembly;
 the base part is configured to connect the insulating support assembly to the section insulator with the section insulator adapted to be movable in translation relative to at least part of the insulating support assembly along an axis transversal with respect to said reference axis;

the base part comprises at least one connection organ which is adapted to be fixedly connected to the section insulator and comprising a slot having at least a straight portion extending along an axis transversal with respect to said reference axis;

the base part further comprises an extension portion fixedly connected at a lower part of the suspension insulator, and first connecting means passing through the slot and connecting the extension portion with the at least one connection organ;

the extension portion has a U-shaped body and the at least one connection organ is inserted at least partially inside the U-shaped body;

a bushing is fixed to an upper part of the suspension insulator and passing through a portion of the suspension device, and second connecting means connects the suspension device with the bushing;

a spacer is positioned around the bushing and is interposed between an upper part of the suspension insulator and the suspension device.

at least one arm has one lower portion which is connected to the suspension device and an opposite upper portion which is adapted to be connected to a supporting pole of the catenary;

the at least one arm is connected at said lower portion to the suspension device with the arm rotatable around an axis transversal with respect to the suspension device;

the at least one arm comprises adjusting means for adjusting the overall length of the arm itself;

the at least one arm comprises a first arm and a second arm substantially identical to each other, the first and second arms being connected, at a respective lower portion to a corresponding extremity of the suspension device and being rotatable around an axis transversal with respect to the suspension device;

each of said first and second arms comprises a hook configured to be connected to said supporting pole, and a turnbuckle comprising the lower portion connected to the corresponding extremity of the suspension device and the opposite upper portion connected to the respective hook.

The above indicated aim and objects, as well as others which may become apparent from the following description, are also achieved by a catenary adapted for powering an electrical vehicle, wherein it comprises at least one insulating support assembly comprising:

a base part which is adapted to connect the insulating support assembly to a section insulator of the catenary;

a suspension insulator which extends from the base part along a reference axis; and a suspension device which is suitable to be hung to a supporting pole of the catenary, wherein the suspension device is connected to an upper part of and is movable relative to the suspension insulator.

In particular, the catenary is notably a catenary of a tramway line or of a trolleybus line, but it can be also a catenary for powering any other suitable electrical vehicle on any type of suitable road, such as electrified road or highways and the like for supplying electrical cars, trucks, buses et cetera.

BRIEF DESCRIPTION OF THE DRAWINGS

Further characteristics and advantages will become apparent from the description of some preferred but not exclusive exemplary embodiments of an insulating support assembly according to the invention, illustrated only by way of non-limitative examples with the accompanying drawings, wherein:

FIG. 1 a is a view illustrating the insulating support assembly of FIG. 1 connected with a section insulator having the connection with a buttonhole;

DETAILED DESCRIPTION OF THE PREFERRED EMBODIMENTS

Figure 1:
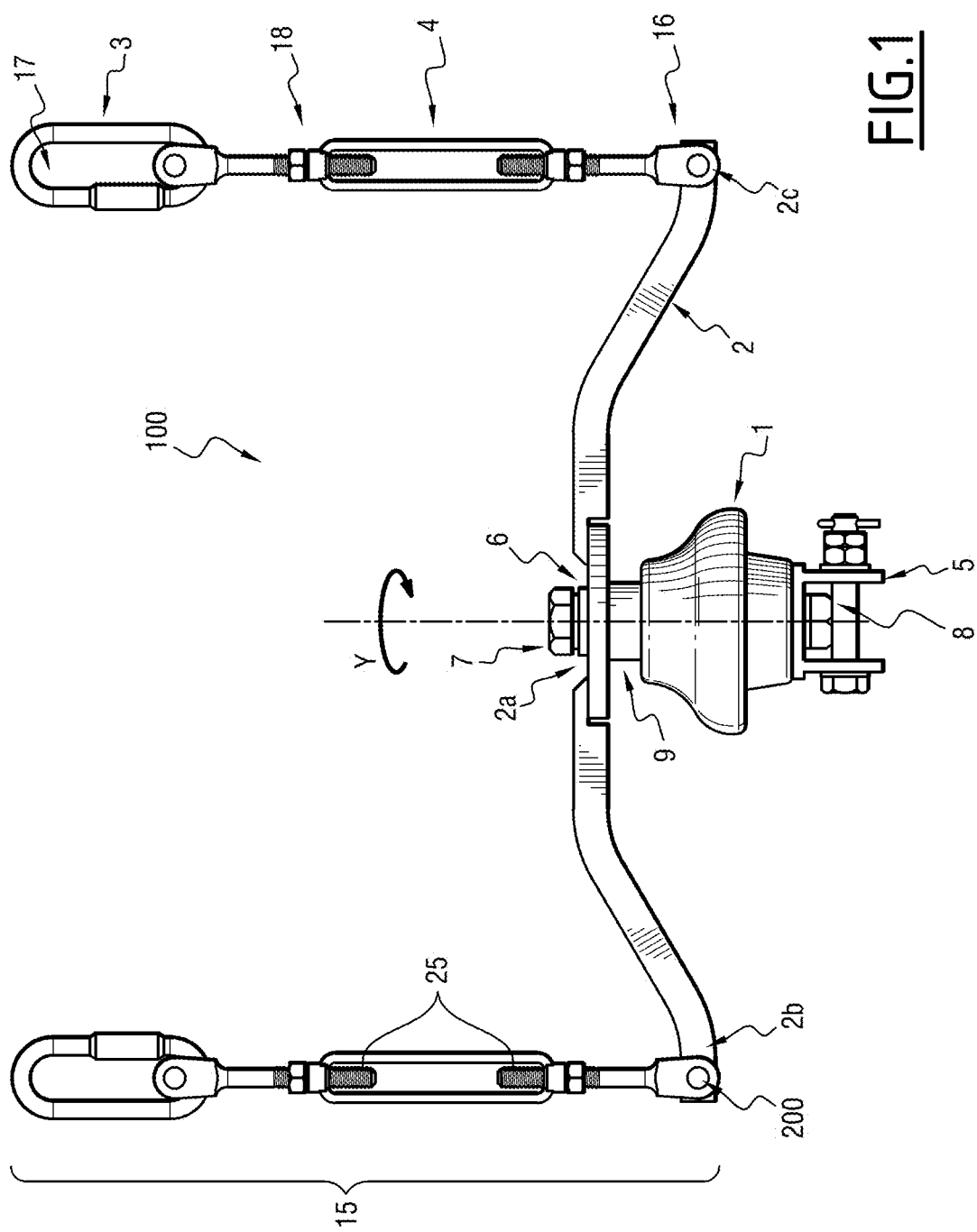
FIG. 1 is a view illustrating an insulating support assembly for a catenary applied to a railway line, according to the present invention.
Figure 1A:
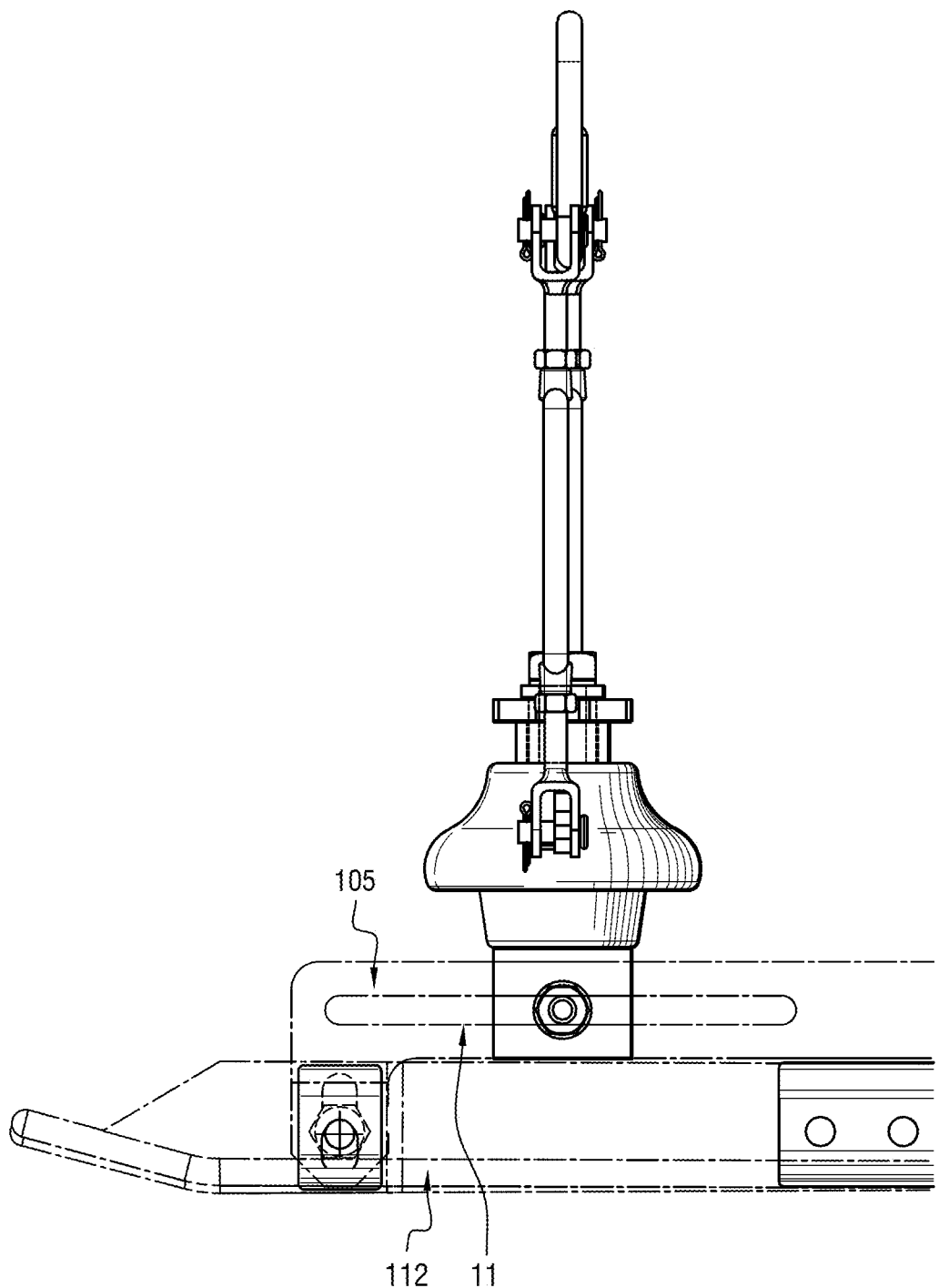

It should be noted that in the detailed description that follows, identical or similar components, either from a structural and/or functional point of view, have the same reference numerals, regardless of whether they are shown in different embodiments of the present disclosure.

It should be also noted that in order to clearly and concisely describe the present disclosure, the drawings may not necessarily be to scale and certain features of the disclosure may be shown in somewhat schematic form.

Further, when the term "adapted" or "arranged" or "configured" or "shaped", is used herein while referring to any component as a whole, or to any part of a component, or to a combination of components, it has to be understood that it means and encompasses correspondingly either the structure, and/or configuration, and/or form, and/or positioning.

When the terms transversal or transversally are hereby used, they have to be understood as encompassing a direction non-parallel to the part(s) they refer to, and perpendicularity has to be considered a specific case of a transverse direction.

Finally, when the terms substantial or substantially are used with reference to moving parts, e.g. two parts moving substantially solidly to each other, it has to be understood that they move together apart from unavoidable mechanical inertia, while when referring to relative positioning, e.g. one part substantially parallel to another part or to an axis, it has to be understood as encompassing a tolerance of plus or minus 5° with respect to that reference part or reference axis.

FIG. 1 illustrates an exemplary embodiment of an insulating support assembly according to the invention, therein indicated by the overall reference number 100.

Figure 2:
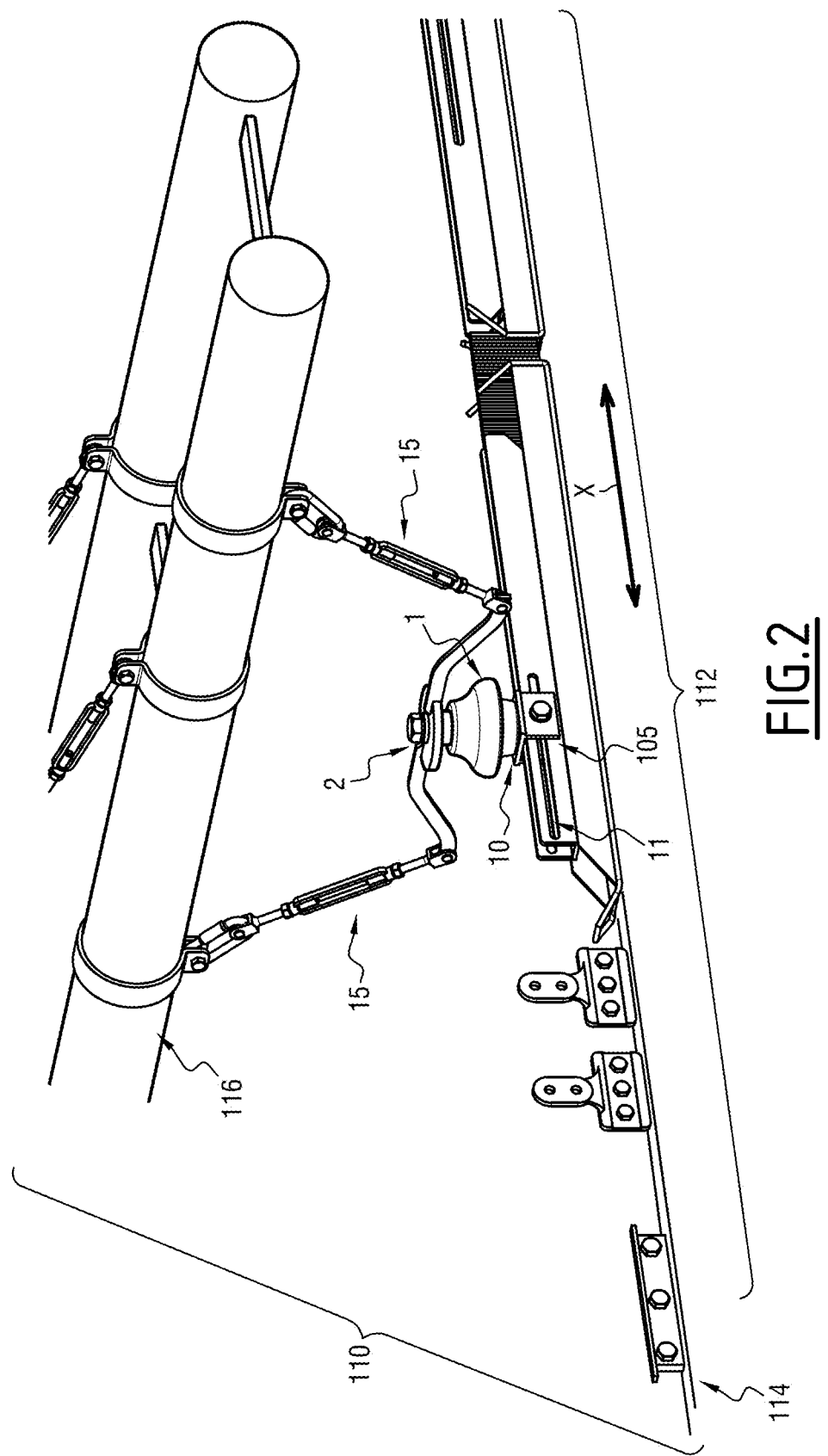
FIG. 2 is a view illustrating the insulating support assembly of FIG. 1 connected to a cantilever beam of a supporting pole and to a section insulator coupled to a contact wire of a catenary.

The insulating support assembly 100 comprises a base part, indicated in FIG. 2 by the cumulative reference number 105, which is adapted to connect the insulating support assembly 100 to a section insulator of a catenary.

In particular, in FIG. 2 there is illustrated an exemplary embodiment of a section insulator, therein indicated by the reference number 112, which is connected to a contact wire 114 of a catenary 110, according to solutions per se known in the art or readily available to those skilled in the art.

Clearly, various types of section insulators different from the one illustrated, can be used along a railway line and in function of the specific railway line.

As previously mentioned, the catenary 110 is an aerial system used for feeding electric power to transiting electrical vehicles, for examples in railway lines, and comprises, among others, and according to solutions well known in the art and therefore also not described herein in details, the above indicated contact wire 114, a plurality of section insulators 112 connected to the wire 114 at different positions along the line, and a plurality of supporting poles which are installed along the line, spaced apart from each other.

These poles are usually provided with a cantilever beam for suspending the contact wire 114 over the tracks or the road service routes; in the example depicted in FIG. 2, there is schematically illustrated a portion of a supporting pole, and in particular of its cantilever beam, indicated by the reference number 116.

The insulating support assembly 100 further comprises at least:
- a suspension insulator 1, which extends from the base part 105 along a reference axis Y, e.g. a substantially vertical axis. This suspension insulator 1 has a shaped body realized in any suitable electrically insulating material;
- a suspension device 2, which is for example positioned transversally relative to the reference axis Y; in the embodiment illustrated the suspension device 2 has a body having a bow or crossbow shaped plate, and hereinafter will be referred to as the suspension plate 2.

The suspension plate 2 is destined to be connected, namely hung, to a supporting pole 116, via suitable connecting means.

To this end, the assembly 100 further comprises for example at least one arm, indicated in FIG. 1 by the overall number 15, which has a lower portion 16 connected to the suspension plate 2, and an opposite upper portion 17 which is adapted to connect the whole insulating support assembly 100 to a supporting pole 116 of the catenary 110, and in particular to its cantilever beam 116.

Usefully, in the insulating support assembly 100 according to the present invention, the suspension plate 2 is connected to an upper part of and is movable relative to the suspension insulator 1.

In particular, according to one embodiment, the suspension plate 2 is connected to an upper part of and is mounted rotatable around the reference axis Y relative to the suspension insulator 1.

Preferably, in the insulating support assembly 100 according to the present invention, the base part 105 is configured to connect the insulating support assembly 100 to the section insulator 112 in such a manner that the section insulator 112 is movable relative to at least part of the insulating support assembly 100 itself.

In particular, the base part 105 is configured to connect the insulating support assembly 100 to the section insulator 112 with the section insulator 112 which is allowed to translate relative to at least part of the insulating support assembly 100 along an axis X transversal with respect to the reference axis Y.

In the embodiment illustrated in the FIGS. 1 and 2, the base part 105 comprises at least one connection organ or means 10 which is adapted to be fixedly connected to the section insulator 112 and comprises a slot 11 having at least a straight portion extending along the transversal axis X; in particular, in the example illustrated, the slot 11 is completely straight.

FIG. 1 a better illustrates the support assembly 100 with its base part 105 assembled with a section insulator 112 equipped with a plate having a buttonhole 11, thus allowing an horizontal movement.

Further, the base part 105 comprises an extension portion 5 which is solidly connected at a lower part of the suspension insulator 1, and first connecting means 8, passing through the slot 11 and connecting the extension portion 5 with the connection plate 10.

In the embodiment illustrated, the extension portion 5 is in particular U-shaped.

For example, the first connecting means 8 comprise for example a screw and an associated nut; clearly, other equivalent connecting means can be used.

In practice, according to the embodiment illustrated, the connection plate 10 is inserted, at least partially, inside the U-shaped portion 5 fixed to the suspension insulator 1, with the connecting means 8 realizing their mutual sliding mechanical coupling; in case of a dimensional variations of the length of the contact wire 114, the section insulator 112 which is connected on one side with the contact wire 114 and on the other side with the connection plate 10, can translate, together with the connection plate 10, along the axis X in one direction or in the opposite direction relative to the remaining parts of the assembly 100.

Clearly, it is possible to use more than one connection plate 10, for example two plates which are fixedly connected to the section insulator 112 positioned side by side to each other, and both connected to the same U-shaped portion 5 as above described; and/or it is possible to use one or more extension portions 5 having a different shape.

Further, as better visible in FIG. 1, the insulating support assembly 100 comprises: a bushing 6 which is fixed to an upper part of the suspension insulator 1 and passes through a central portion 2a of the suspension plate 2; a spacer 9 which is positioned around the bushing 6 and is interposed between an upper part of the suspension insulator 1 and the suspension plate 2; and second connecting means 7 which close the bushing 6 against the suspension insulator 1. The rotation of the suspension plate 2 is allowed thanks to the the fact that the thickness formed by the spacer 9 plus the central portion 2a is less than the connection seat of the bushing 6 so that there is a clearance for free rotation.

According to the exemplary embodiment illustrated in the FIGS. 1 and 2, the at least one arm 15 is connected at its lower portion 16 to the suspension plate 2 in an articulated manner, and in particular with the arm 15 which can rotate around an axis 200 transversal with respect to the suspension plate 2.

In one possible embodiment, the at least one arm 15 comprises adjusting means for adjusting its overall length.

In particular, in the insulating support assembly 100 according to the invention, the at least one arm 15 comprises a first arm 15 and a second arm 15, substantially identical to each other, which are disposed substantially symmetric to each other with respect to the reference axis Y.

More in details, the first and second arms 15 are connected, each at a respective lower portion 16, to a corresponding extremity 2b, 2c of the suspension plate 2 and are both rotatable around an axis 200 transversal with respect to the suspension plate 2.

Conveniently, in the exemplary embodiment illustrated, each arm 15 comprises a hook or hook-shaped portion 3 which is configured to be connected to the supporting pole 116, e.g. its cantilever beam, and a turnbuckle 4 which comprises the lower portion 16 connected to the corresponding extremity 2b or 2c of the suspension plate 2, and an opposite upper portion 18 connected to the respective hook 3.

In turn, according to this embodiment, the adjusting means comprises a first threaded connection 25 at the connection between each turnbuckle 4 with the suspension plate 2, and a second threaded connection at the connection between each turnbuckle 4 and the corresponding hook 3.

As above indicated, the insulating supporting assembly 100 according to the invention is suitable to be used in catenaries for feeding different types of electrical vehicles, travelling along different types of railway lines, in particular tramways or trolleybus lines, with different types of section insulators and/or with different installing configurations. Hence, the present invention encompasses also a catenary 110 adapted for powering an electrical vehicle, notably of a tramway or trolleybus line, characterized in that it comprises at least one insulating support assembly 100 as previously described, and in particular as defined in one or more of the appended claims.

It is evident from the foregoing description that the insulating supporting assembly 100, and the related catenary 110 including such assembly 100 according to the present invention, allow achieving the intended aim and objects.

Indeed, the assembly 100 according to the invention incorporates some degrees of freedom among parts of its own whole structure and also relative to the section insulator, thus avoiding, or at least properly mitigating, the undesired consequences of unexpected efforts caused by the thermal variations of the contact wire and/or by other external factors, such as the action of winds that can subject some parts of the assembly 100 to over stresses, e.g. fatigue stresses.

In particular, the fact that the section insulator is allowed to freely translate along the reference axis X allows to properly face and adequately compensate the thermal variations of the contact wire 114; this positive effects is further enhanced by the fact that the suspension plate 2 can freely rotate around the axis Y, thus preventing or at least mitigating also the negative effects of a possible torque shearing exerted on the assembly 100. The mobility of the arms 15 relative to the suspension plate 2, their adjustable length, and the presence of the hooks 3, in addition to contributing to the above effects, and in synergy with the indicated freedom of translation along the axis X and rotation around the reference axis Y, allow to adapt easily the whole assembly 100 to different types of sections insulators, to different types of installing configurations, e.g. in curves and turnouts, and to quite easily absorb constructive mechanical tolerances and installing variations. Hence, also installation time and difficulties are reduced.

These results are achieved according to a solution which is simpler, less cumbersome and lighter with respect to known solutions which do not offer all the degrees of freedom together.

The assembly 100 and related catenary 110 thus conceived are susceptible of modifications and variations, all of which are within the scope of the inventive concept as defined in particular by the appended claims; for example, some of the parts described can be differently shaped and/or connected in a way different from what above described, provided that such modifications would anyhow allow to carry the functionalities such parts are conceived to perform within the frame of the present invention.

All the details may furthermore be replaced with technically equivalent elements.

What is claimed is:

1. An insulating support assembly for a catenary adapted for powering an electrical vehicle, wherein the insulating support assembly comprises at least:
    a base part which is adapted to connect the insulating support assembly to a section insulator of the catenary;
    a suspension insulator which extends from the base part along a reference axis; and
    a suspension plate which is suitable to be hung to a supporting pole of the catenary, wherein the suspension plate is connected to an upper part of and is movable relative to the suspension insulator,
    wherein said base part comprises at least one connector which is adapted to be fixedly connected to the section insulator and comprises a slot having at least a straight portion extending along an axis transversal with respect to said reference axis.

2. The insulating support assembly according to claim 1, wherein said base part further comprises an extension portion fixedly connected at a lower part of the suspension insulator, and connecting means passing through the slot and connecting the extension portion with the at least one connector.

3. The insulating support assembly according to claim 2, wherein said extension portion has a U-shaped body and the at least one connector is inserted at least partially inside the U-shaped body.

4. The insulating support assembly according to claim 1, further comprising a bushing fixed to an upper part of the suspension insulator and passing through a portion of the suspension plate, and connecting means connecting the suspension plate with the bushing.

5. The insulating support assembly according to claim 4, further comprising a spacer positioned around the bushing and interposed between an upper part of the suspension insulator and the suspension plate.

6. The insulating support assembly according to claim 1, further comprising at least one arm having one lower portion connected to the suspension plate and an opposite upper portion which is adapted to be connected to a supporting pole of the catenary.

7. The insulating support assembly according to claim 6, wherein said at least one arm is connected at said lower portion to the suspension plate with the at least one arm rotatable around an axis transversal with respect to the suspension plate.

8. The insulating support assembly according to claim 6, wherein said at least one arm comprises adjusting means for adjusting the overall length of the at least one arm itself.

9. The insulating support assembly according to claim 6, wherein said at least one arm comprises a first arm and a second arm substantially identical to each other, the first and second arms being connected, at a respective lower portion to a corresponding extremity of the suspension plate and being rotatable around an axis transversal with respect to the suspension plate.

10. The insulating support assembly according to claim 9, wherein each of said first and second arms comprises a hook configured to be connected to said supporting pole, and a turnbuckle comprising the lower portion connected to the corresponding extremity of the suspension plate and the opposite upper portion connected to the respective hook.

11. A catenary adapted for powering an electrical vehicle, wherein the catenary comprises at least one insulating support assembly according to claim 1.

12. The insulating support assembly according to claim 1, wherein the suspension plate is connected to an upper part of and is rotatable around said reference axis relative to the suspension insulator.

13. The insulating support assembly according to claim 1, wherein said base part is configured to connect the insulating support assembly to the section insulator with the section insulator movable relative to at least a part of the insulating support assembly.

14. The insulating support assembly according to claim 13, wherein said base part is configured to connect the insulating support assembly to the section insulator with the section insulator adapted to be movable in translation relative to at least a part of the insulating support assembly along an axis transversal with respect to said reference axis.

* * * * *